Feb. 19, 1929.
W. S. LEMMON
1,702,833
ELECTRICAL CONDENSER
Filed June 8, 1923    2 Sheets-Sheet 2
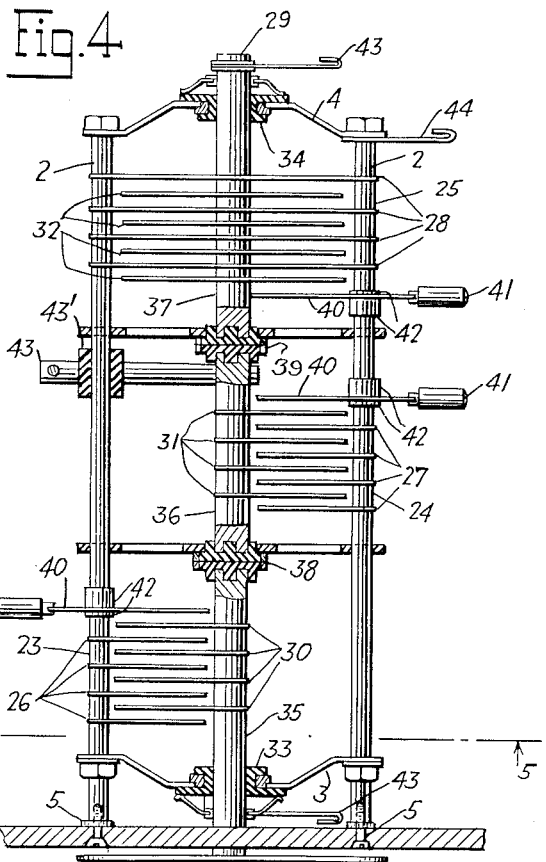
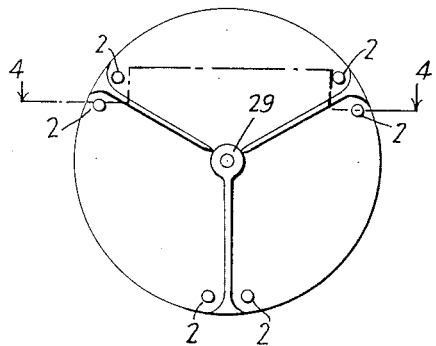
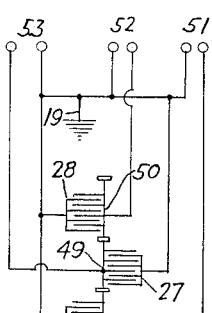
Walter S. Lemmon
INVENTOR
BY
Moses, Hammond & Nolte
ATTORNEYS Patented Feb. 19, 1929.

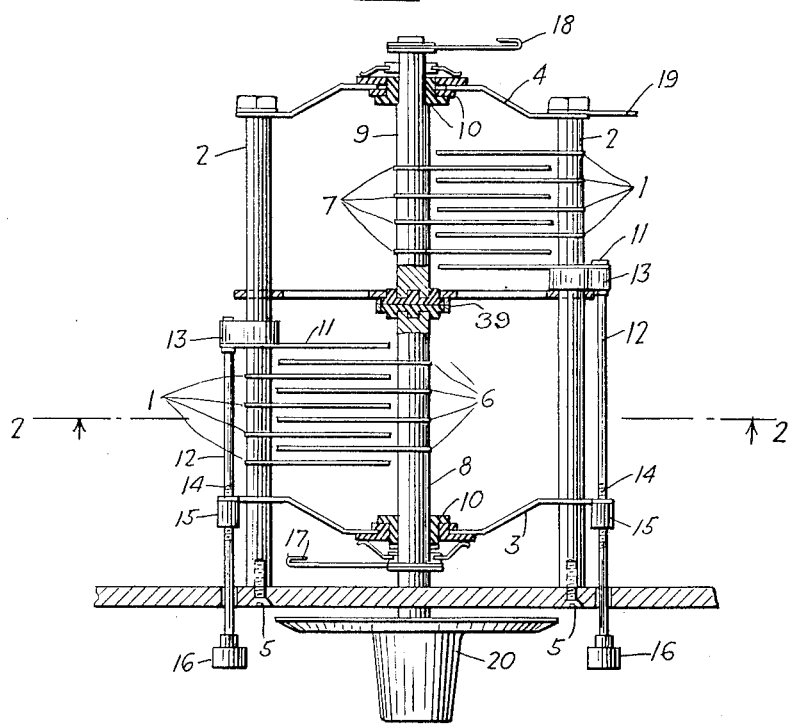
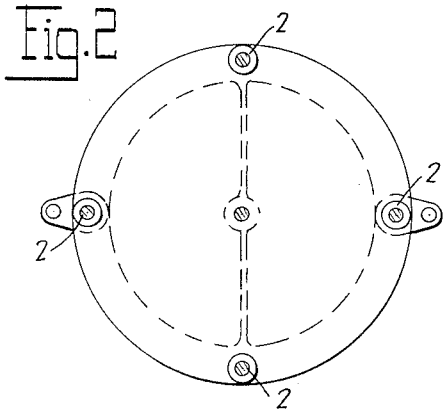
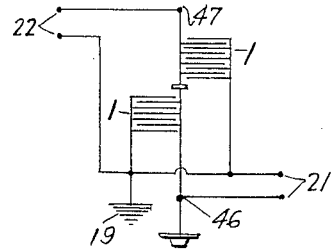

1,702,833

UNITED STATES PATENT OFFICE.

WALTER S. LEMMON, OF NEW YORK, N. Y.

ELECTRICAL CONDENSER.

Application filed June 8, 1923. Serial No. 644,079.

This invention relates to electrical condensers of the variable type, in which a movable set of plates is interleaved with a stationary set and can be adjusted relative to the stationary set to vary the capacity of the condenser.

In some electrical circuits, particularly in multi-stage tuned radio amplifiers, it is necessary to increase or to decrease the capacity of two or more circuits at the same time. Where the circuits are tuned to the same wave length, the change in capacity in each circuit must be in predetermined or equal proportions.

It is one of the objects of this invention to provide a multiple condenser which may be used to increase or decrease the capacity of a plurality of circuits at the same time, whereby two or more circuits may be simultaneously tuned.

Another object of the invention is to provide a multiple condenser in which the individual condenser units are mounted within one set of end plates whereby the cost of construction is reduced and an increased efficiency in the adjustment of the condenser realized.

Another object is to provide a multiple condenser in which a single shaft may be utilized to manipulate the movable plates in a plurality of independent condenser units to vary the capacity simultaneously in a plurality of circuits. In this way only one dial is used for a plurality of circuits and space on the panel board is economized.

Other objects and advantages will appear as the description proceeds.

In the drawings which illustrate a preferred form of the invention,

Figure 1 is a part sectional view of a multiple condenser as applied to two circuits;

Figure 2 is a part sectional plan view thereof, on the line 2—2 of Figure 1;

Figure 3 is a schematic wiring diagram of the use of the condenser in a two circuit system;

Figure 4 is a view similar to Figure 1, taken on the line 4—4 of Figure 5, illustrating the invention as applied to more than two circuits;

Figure 5 is a plan view of the condenser illustrated in Figure 4; and

Figure 6 is a diagrammatic view of the wiring used in a three-circuit system.

Similar characters of reference designate similar parts in each of the several views.

In the embodiment illustrated in Figures 1 and 2, the stationary plates 1 are fastened in suitably spaced relation upon the posts 2 which connect the end plates 3 and 4 and project outwardly beyond plate 3, to provide a means for securing the condenser to the panel board, as indicated at 5.

The movable plates 6 and 7 are carried by the shafts 8 and 9 which are insulated from the end plates 3 and 4, at 10, and are connected together by an insulating coupling 10′ so that the plates 6 and 7 may be rotated in unison to simultaneously adjust the capacity of the two condenser units. The end supports 3 and 4 are bell-shaped to provide rigidity in the support of the bearings 10 of the shafts 8 and 9.

In order to secure absolute uniformity in the capacity of the two condenser units, one or both of them may be provided with a fine adjustment or compensating plate. This may take the form of a plate 11 slidably mounted upon post 2. A rod 12, which is rotatably fixed in a projecting lug 13 on the post 11, is provided with a screw thread 14 cooperating with a nut 15 fixed upon the end plate 3, so that when the rod 12 is rotated by means of the knob 16, the plate 11 is moved upon the post 2 toward or away from the remaining plates of the condenser unit, so as to secure the desired uniformity in the capacity of the condenser units. The auxiliary plate 11 may, of course, be adjusted at the factory and locked in the desired position, in which case the rod 12, nut 15, knob 16, etc., can be omitted from the set.

Contact couplings are provided for the movable plates at 17 and 18 and a ground connection for the stationary plates and frame is indicated at 19. Separate circuits 21 and 22 indicated in Figure 3, may be connected to the condenser units, as will be readily understood.

In operation, the shafts 8 and 9 are rotated by turning the indicating dial 20 attached thereto to insert the movable plates 7 and 8 between the stationary plates 1 to add capacity in equal or predetermined ratios to the two circuits 21 and 22.

In the modification shown in Figures 4, 5 and 6, three sets of condenser units 23, 24 and 25 are illustrated as an example of how the invention may be used to tune more than two circuits. In this modification, the three sets of stationary plates 26, 27 and 28 are mounted upon the posts 2, so that they are spaced approximately 120° around the central shaft 29, and the movable plates 30, 31 and 32 are mounted upon the central shaft 29 in the same 120° relation, as illustrated in Figure 5, so as to balance the weight of the condenser as a whole and of the central shaft. The central shaft 29 is insulated from the end plates at 33 and 34, and the three sections 35, 36 and 37 of the shaft are insulated from each other at 38 and 39, so as to separate the three circuits. A fine adjustment control is provided at 40 for each condenser unit, for the purpose of securing absolute uniformity in the capacity of each unit. The plates 40 are pivoted upon the posts 2 and are provided with handles 41 to assist in adjusting the same; and to lock them in adjusted position the nuts 42 may be provided upon the posts.

Contacts 43 are provided upon the shaft for each of the movable sets of plates, the contact for the intermediate set or sets being insulated from the posts 2 as at 43', and a ground connection for the stationary plates is indicated at 44.

In the wiring diagrams illustrated in Figures 3 and 6, the stationary plates 1, 26, 27 and 28 and the frame are connected together and maintained at a ground potential, as illustrated at 19, so as to minimize inter-stage capacity effects. The grounded connection of the frame also shields the condenser in all directions and thereby minimizes interference with the other apparatus in the set. Leads are taken off from each set of the movable plates at 46 and 47 (Fig. 3), and at 48, 49 and 50 (Fig. 6), and connected up to the circuits 21, 22 and 51, 52 and 53, respectively, together with the leads of the corresponding stationary set of plates.

A shield plate 54 or screen may be provided between the sets of movable plates to further minimize the capacity coupling between the circuits, if desired.

Although I have herein shown and described only certain specific forms of embodiment of my invention, it will be understood that many changes and modifications may be made therein within the scope of the appended claims without departing from the spirit and scope of the invention, it being my intention to claim the same as broadly as the state of the prior art will permit.

What is claimed is:

1. In an electrical condenser, a plurality of separate condenser units, means for simultaneously adjusting the units, and means settable to substantially equalize capacity factors of said units, to cause the simultaneous adjustment of them to result in equal increments or decrements of their capacities.

2. An electrical condenser comprising a plurality of condenser units, means to shield the units, adjustable means for rendering the capacity curves of the units substantially identical, and means to adjust the units to vary the capacity in a plurality of circuits at the same time.

3. An electrical condenser comprising a plurality of electrically independent condenser units, adjustable means for producing correspondence between the units, means to adjust the units equally to simultaneously tune a plurality of circuits connected thereto, and shielding means interposed between said units.

4. In an electrical condenser, a set of end supports, a plurality of condenser units mounted between the end supports, means to insulate the units from each other, and from the end supports, means to equalize the capacity factors in the different units to render the capacity curves of the units substantially identical, and means to simultaneously and correspondingly vary the capacity in each unit.

5. In an electrical condenser, a pair of belled end supports, posts connecting the end supports, a plurality of sets of stationary plates upon the posts, a rotatable shaft extending through the end supports and insulated therefrom, a plurality of sets of movable plates upon the shaft, means to insulate and shield the movable sets of plates from each other, means to maintain the stationary plates and frame at a ground potential, and means to rotate the shaft to interleave the movable plates with the stationary plates to simultaneously vary the capacity in each of the condenser sets.

6. An electrical condenser comprising a plurality of condenser units, means to independently adjust a capacity factor of each unit to render the capacity curves of the units substantially identical, and means to simultaneously vary the capacity of each unit.

7. An electrical condenser comprising a plurality of condenser units, a compensating plate to equalize capacity factors of the units to render the capacity curves of the units substantially identical, and means to vary the capacities of the units.

8. An electrical condenser comprising a plurality of condenser units, a compensating means to equalize capacity factors of the units to render the capacity curves of the units substantially identical, and means to simultaneously vary the capacity of each unit.

9. In a variable electrical condenser, a plurality of separate condenser units, means to independently adjust a capacity factor of each unit to render the capacity curves of the units substantially identical, a rotatable shaft extending through all the units and carrying the movable plates of each unit, means to insulate the movable plates of one unit from the other, and means to rotate the shaft to simultaneously vary the capacity of each unit.

In testimony whereof I hereunto affix my signature.

WALTER S. LEMMON.